H. P. JULIUS.
APPARATUS FOR MAKING SOLID CARBON DIOXID.
APPLICATION FILED MAR. 16, 1911.

1,018,568.

Patented Feb. 27, 1912.

2 SHEETS—SHEET 1.

Witnesses
Ernest Crocker
Henry F. Bright

Inventor
Harry P. Julius
By
Crandall Crandall
Attorneys

H. P. JULIUS.
APPARATUS FOR MAKING SOLID CARBON DIOXID.
APPLICATION FILED MAR. 16, 1911.
1,018,568.
Patented Feb. 27, 1912.
2 SHEETS—SHEET 2.
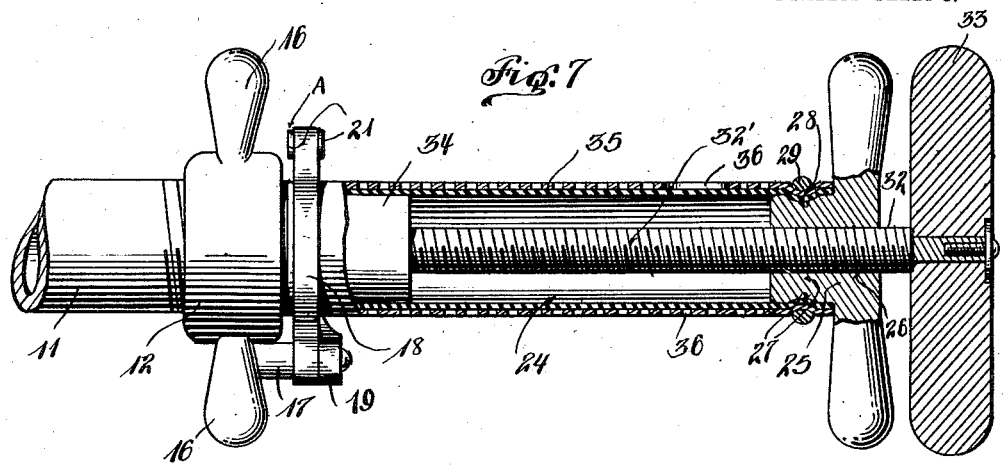
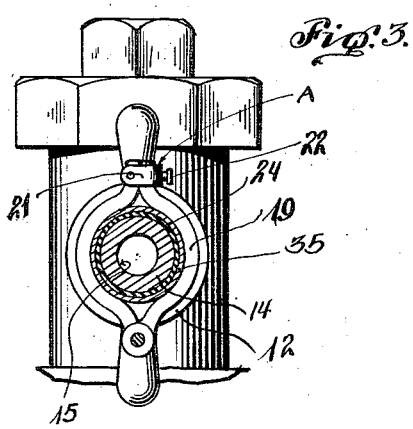
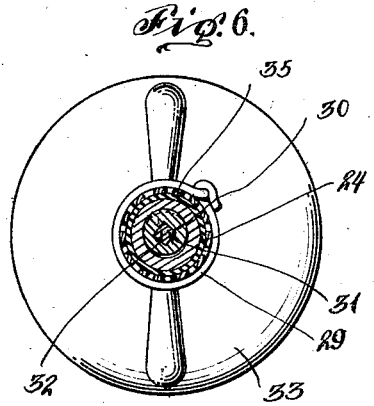
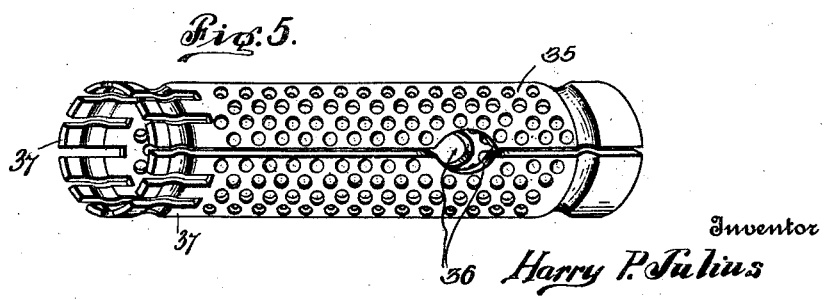
Inventor
Harry P. Julius
Witnesses
Ernest Crocker
Henry T. Bright
By
Attorneys

UNITED STATES PATENT OFFICE.

HARRY P. JULIUS, OF ST. LOUIS, MISSOURI.

APPARATUS FOR MAKING SOLID CARBON DIOXID.

1,018,568.

Specification of Letters Patent.

Patented Feb. 27, 1912.

Application filed March 16, 1911. Serial No. 614,950.

*To all whom it may concern:*

Be it known that I, HARRY P. JULIUS, a citizen of the United States, residing at St. Louis, in the State of Missouri, have invented certain new and useful Improvements in Apparatus for Making Solid Carbon Dioxid; and I do hereby declare the following to be a full, clear, and exact description of the invention, such as will enable others skilled in the art to which it appertains to make and use the same.

This invention relates to a condensing and compressing apparatus for liquid carbon dioxid.

The object of the invention resides in the provision of an apparatus of the character named which is adapted to be detachably connected with the outlet of a liquid carbon dioxid storage tank and when so connected will cause the liquid carbon dioxid escaping from the tank to be precipitated therein in the form of crystal, and in providing means whereby these crystals may be compressed in the shape of sticks or pencils and readily removed from the apparatus for use in dental and surgical operations, for producing local anesthesia, the removal of superficial epitheliomata, and skin diseases and in various operations in the treatment of diseases.

With these and other objects in view, the invention consists in the details of construction and arrangement and combination of parts to be hereinafter more fully described and particularly pointed out in the appended claim.

In describing the invention in detail reference will be had to the accompanying drawings wherein like characters of reference denote corresponding parts in the several views; and in which—

Figure 1:
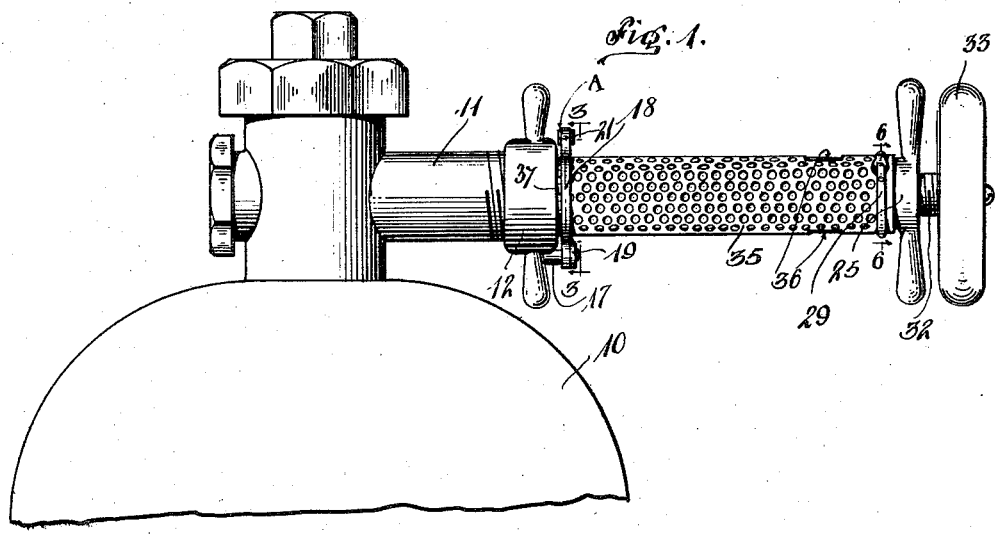
Figure 2:
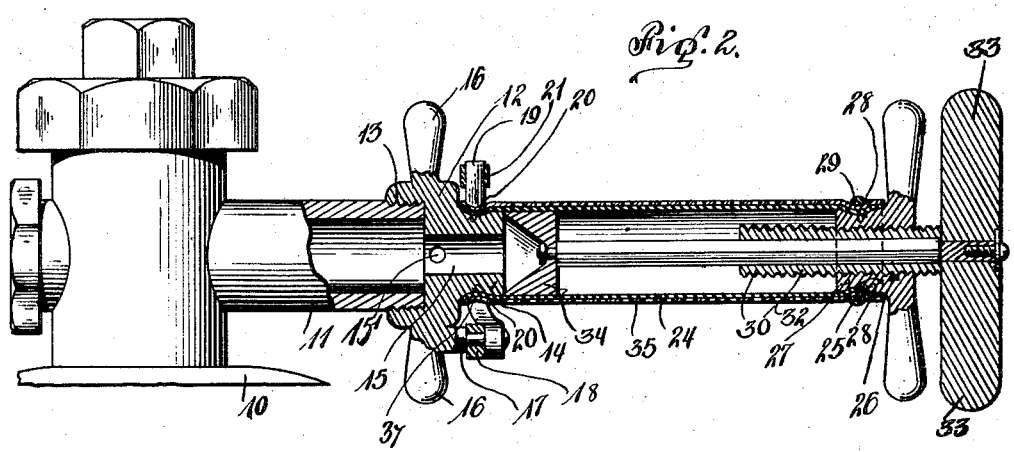
Figure 4:
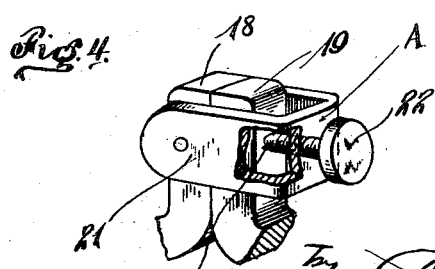

Figure 1 is a side view of the apparatus attached to the outlet of a carbon dioxid storage tank; Fig. 2, an enlarged longitudinal sectional view of the apparatus; Fig. 3, an enlarged section on the line 3—3 of Fig. 1; Fig. 4, a detail view, partly in section showing the manner of locking the free ends of the clamping jaws carried by one of the heads of the apparatus; Fig. 5, a detail view of a fragment of the perforated metallic sleeve surrounding the tube of the apparatus; Fig. 6, an enlarged section on the line 6—6 of Fig. 1; and Fig. 7, a longitudinal section of a slightly modified form of the apparatus.

Referring to the drawings, 10 indicates a carbon dioxid storage tank provided with the usual valve outlet 11.

The condensing and compressing apparatus which forms particularly the subject matter of this application is shown as comprising a head 12 having a threaded recess 13 in one end thereof adapted to be screwed upon the outlet 11. The other end of this head 12 is provided with a nipple 14, and a passage 15 extends through this nipple and communicates with the recess 13. Passing through the head 12 and communicating with the passage 15 is another passage 15' which is controlled by a safety valve not shown. Gripping wings 16 project radially from the head 12 at diametrically opposite points and serve to afford a means whereby the head may be easily screwed upon the outlet 11. A stud 17 projects from the same end of the head 12 as the nipple 14 and lies in spaced relation to the lateral limitation of said nipple. Pivotally mounted upon this stud 17 is a pair of clamping jaws 18 and 19, which are of arcuate formation and are adapted to be moved so as to engage in an annular groove 20 at the inner end of the nipple 14. The free ends of these jaws 18 and 19 are adapted to be secured in clamping position in the groove 20 by means of a fastening device A. This device is formed of a U shaped member 21 which has the free ends of its arms pivotally connected to the free end of the jaw 18 and is adapted to pass over the free end of the jaw 19 when said jaws 18 and 19 are disposed in the annular groove 20. A binding screw 22 is mounted in the bight portion of the member 21 and is adapted to be operated so as to engage in a recess 23 in the free end of the jaw 19. When the binding screw 22 is moved into this recess 23, it gradually forces the free end of the jaw 19 toward the free end of the jaw 18 and thus presses the jaws into the groove 20 with considerable force. Before securing the jaws 18 and 19 in the groove 20 as just described, one end of a porous tube 24 is slipped over the nipple 14 so as to be interposed between the jaws 18 and 19 and the nipple 14 when said jaws are moved into the groove 20. It will thus be apparent that the jaws 18 and 19 serve to detachably secure the porous tube 24 to the nipple 14 in an efficient manner.

The end of the tube 24 which is disposed opposite to the end thereof to which the head 12 is attached is closed by means of a head 25 provided with a threaded central opening 26. This head 25 is provided on its inner end with a nipple 27 having formed in its rear portion an annular groove 28. The tube 24 is slipped over this nipple 27 and detachably secured thereto by means of a clamping band 29 which seats in the groove 28. Mounted in the threaded opening 26 is a threaded bushing 30 which has a squared longitudinal opening 31 extending therethrough. Mounted in this longitudinal opening 31 is a squared stem 32 having its outer end provided with a gripping handle 33 and its inner end rotatably connected to a plunger 34, which latter is mounted for reciprocation in the tube 24. By this construction it will be apparent that upon the rotation of the stem 32 by means of the handle 33, the bushing 30 will also be rotated and move inwardly of the tube and thus force the plunger 34 toward the head 12. It will also be equally apparent that if during any stage of the operation of the apparatus, it is desired to reciprocate the plunger 34 without resorting to a rotation of the bushing 30, it can be easily accomplished by simply sliding the stem 32 in said bushing.

Surrounding the tube 24 is a sleeve of perforated metal 35 having a pair of large openings 36 therein. These large openings are utilized for the purpose of feeling the tube 24 to ascertain the quantity of material that has been deposited therein, while at the same time the sleeve as a whole serves to strengthen the tube 24.

When it is desired to use the apparatus, the plunger 34 is positioned adjacent the head 25 and the head 12 screwed upon the outlet 11 of the liquid carbon dioxid storage tank. It may be stated here that carbon dioxid tanks usually have an outlet tube extending from the bottom of the tank and connected with the outlet tube and that the liquid is under a very high pressure. When the valve in the outlet tube is opened sufficiently, liquid carbon dioxid is sprayed into the tube 24. Here its pressure is lowered to about that of the atmosphere and as a consequence a large part of it is immediately vaporized and this rapid evaporation so lowers the temperature of the remainder as to convert it into a frost or snow, the vapor given off passing out through the pores of the tube 24 into the atmosphere. This operation is continued until the porous tube 24 is filled with crystallized carbon dioxid. It will be noted that the pressure in the tube 24 is limited by means of the safety valve located at the outer end of the passage 15'. When the tube 24 is completely filled with crystals, the valve 11 is cut off and the material in the tube compressed by the actuation of the plunger 34. The jaws 18 and 19 are then released so as to permit of the removal of the tube 24 from the nipple 14 and the plunger 34 actuated to force the compressed stick of crystals out of the tube.

In the modified form of apparatus illustrated in Fig. 7, the stem 32 is provided with threads 32' which engage directly with the threads in the opening 26 through the head 25. By this construction, the plunger may be set at any desired position in the tube 24 so as to enable very small sticks of the material to be formed, it being apparent that the pressure of the gas upon the plunger 34 in Fig. 7 will be ineffective to move said plunger toward the head 25 after said plunger is once set owing to the threaded engagement between the head 25 and the stem 32.

The end of the sleeve 35 which fits over the nipple 14 terminates in a plurality of tongues 37 disposed longitudinally of the sleeve. These tongues serve to permit the end of the sleeve to be easily slipped over the nipple as they may be readily expanded and contracted without affecting the intermediate portion of the sleeve.

It will be noted that while certain particular forms of carrying the invention into practice have been shown and described, variations as to details may be resorted to without departing from the scope of the invention as set forth in the appended claim.

What is claimed is:—

A condensing and compressing apparatus for liquid carbon dioxid, comprising a tube, a head detachably mounted in one end of said tube having means for connection to the outlet of a liquid carbon dioxid storage tank, a second head detachably mounted in the other end of said tube having a threaded opening therethrough, a threaded bushing mounted in said threaded opening, a stem non-rotatably mounted in said bushing and adapted for reciprocation longitudinally of the tube, and a reciprocating plunger mounted in said tube and secured to said stem.

In testimony whereof, I affix my signature, in presence of two witnesses.

HARRY P. JULIUS.

Witnesses:
Jos. W. Julius,
Guy Thompson.